United States Patent [19]
van der Watt et al.

[11] Patent Number: 5,178,661
[45] Date of Patent: Jan. 12, 1993

[54] SOIL TREATMENT

[75] Inventors: Hendrik V. H. van der Watt, Menlo Park; Robin O. Barnard, New Muckleneuk; Izak J. Cronje, Verwoerdburg; Johannes Dekker, Faerie Glen, all of South Africa

[73] Assignee: National Energy Council, Pretoria, South Africa

[21] Appl. No.: 550,485

[22] Filed: Jul. 10, 1990

[30] Foreign Application Priority Data

Jul. 12, 1989 [ZA] South Africa ............... 89/5299

[51] Int. Cl.$^5$ ............................................. C05F 11/02
[52] U.S. Cl. ............................................. 71/24; 71/903; 71/904
[58] Field of Search ............... 71/23, 24, 903, 904

[56] References Cited

U.S. PATENT DOCUMENTS

| 2,916,853 | 12/1959 | Latourette et al. | 71/24 X |
| 3,264,084 | 8/1966 | Karcher | 71/24 |
| 3,895,536 | 10/1976 | Abbe et al. | 71/24 |
| 4,786,307 | 11/1988 | Marihart | 71/24 X |

FOREIGN PATENT DOCUMENTS

| 282250 | 9/1988 | European Pat. Off. . |
| 284339 | 9/1988 | European Pat. Off. . |
| 1111798 | 5/1968 | United Kingdom . |
| 1128893 | 10/1968 | United Kingdom . |

Primary Examiner—Ferris Lander
Attorney, Agent, or Firm—Cushman, Darby & Cushman

[57] ABSTRACT

A composition for use in applying an alkaline earth metal element to an acidic sub soil. The composition includes the element in the form of a water-soluble salt or complex with fulvic acid in an aqueous medium. The fulvic acid is preferably a coal-derived fulvic acid.

10 Claims, 1 Drawing Sheet

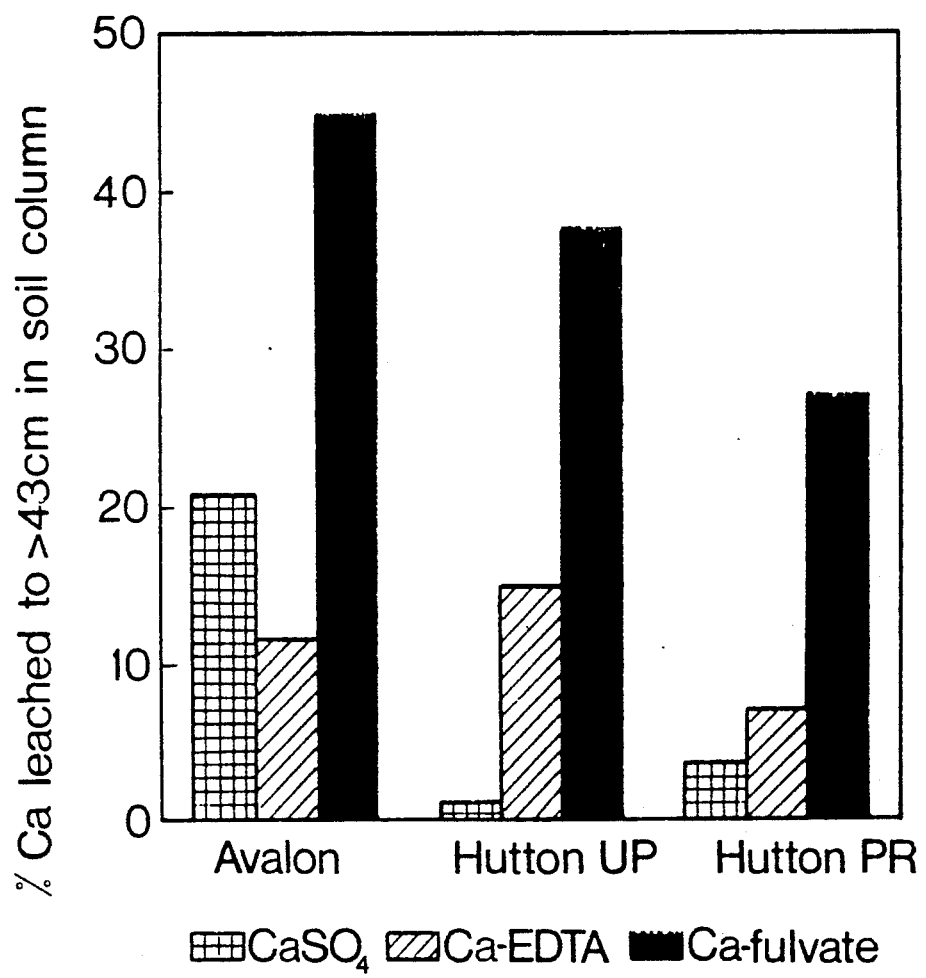

SOIL TREATMENT

BACKGROUND OF THE INVENTION

This invention relates to the treatment of soil.

Difficulties are experienced with the neutralisation and fertilisation of acidic sub soils. These sub soils tend to be poor in essential macroelements such as calcium and magnesium, and also poor in certain trace elements necessitating the transport of such elements to these sub soils. It is possible to neutralise acidic sub soils with neutralising agents such as limestone, but the immobility of such agents in the soil requires expensive and difficult mechanical methods for achieving this.

It is possible to introduce calcium into acidic sub soils by adding gypsum to the soil. However, this has the disadvantage that the pH of the soil drops due to the formation of sulphuric acid and magnesium tends to be leached out.

SUMMARY OF THE INVENTION

According to the present invention, a composition for applying to a soil locus includes one or more alkaline earth metal elements in the form of a water-soluble salt or complex with fulvic acid in an aqueous medium.

Further according to the invention, a method of applying one or more alkaline earth metal elements to a soil locus includes the step of applying a composition as described above to that locus.

DESCRIPTION OF THE DRAWING

The drawing illustrates graphically the results of an experiment carried out using various calcium salts.

DETAILED DESCRIPTION OF THE INVENTION

The invention has particular application to the introduction of one or more of the alkaline earth metal elements to acidic soils, particularly acidic sub soils. The elements in the water-soluble form in the composition can be transported to the acidic sub soils where they are readily available for plant uptake. Sub-soil acidity is a serious problem in many soils of the humid tropics and sub tropics. The high acidity, low calcium levels and often toxic levels of soluble and/or exchangeable aluminum are, among other factors, responsible for severely restricted plant root development in the soils. Application of the composition of the invention ameliorates acidic sub soils. In particular, application of the composition of the invention allows elements such as magnesium and calcium to be transported to such soils. Further, for the higher pH compositions, the pH of the acidic sub soil is raised.

The composition may be produced by providing an aqueous medium containing dissolved fulvic acid and adding the element to this medium as a basic salt or hydroxide. In the case of an alkaline earth metal element, the basic salt may, for example, for an oxide or carbonate.

The fulvic acid will generally be present in the composition in an amount of 0,01 to 85% (m/v).

The composition will generally have a pH in the range of 4 to 10, preferably in the range 7 to 9.

The fulvic acid is preferably a coal-derived fulvic acid hereinafter referred to as "oxifulvic acid". Such acids will typically have elemental analysis and functional group analysis, both on an air-dried basis, as follows:

| Elemental Analysis | |
|---|---|
| Element | Range (%) |
| Carbon | 10–70 (typically 20–45) |
| Hydrogen | 1–6 (typically 3–4) |
| Nitrogen | 1–4 (typically 2–3) |
| Oxygen | 10–70 (typically 40–60) |
| Functional Group Analysis | |
| Functional Group | Range (meq/g) |
| Total acidity | 1–19 (typically 8–14) |
| Carboxylic groups | 2–18 (typically 7–13) |
| Phenolic groups | 0–5 (typically 0,5–2) |

An oxifulvic acid solution may be produced in a process of coal oxidation. In particular, such solutions are preferably produced by a wet oxidation process such as that described in U.S. Pat. No. 4,912,256. This process leads to the formation of a water-insoluble product and water-soluble fulvic acids, typically having a concentration of 1 to 15% (on a mass per volume basis).

PREPARATION OF COAL DERIVED CALCIUM FULVATE SOLUTION

Coal (200 g) and water (400 ml) were slurried in a 2 liter stirred reactor. The reactor was pressurised to 8,0 MPa with oxygen, heated with external bar heaters to 200° C. Oxygen was allowed to flow through the slurry at a rate of 4 liters/min. After one hour the oxygen flow was terminated, the reactor cooled down to room temperature and the pressure released to atmospheric.

The slurry contained oxidised coal (insoluble in water) and a solution of fulvic acids in water. By filtration the oxidised coal was separated from the solution of fulvic acids in water. The concentration of the fulvic acids in water was determined to be 8,45% (on a mass per volume basis).

The coal-derived fulvic acids were found to have the following elemental analysis and functional group analysis, both on an air-dried basis:

| Elemental Analysis | |
|---|---|
| Element | Amount (%) |
| Carbon | 30,1 |
| Hydrogen | 2,8 |
| Nitrogen | 3,2 |
| Functional Group Analysis | |
| Functional Group | Amount (meq/g) |
| Total acidity | 11,8 |
| Carboxylic groups | 10,7 |
| Phenolic groups | 1,1 |

Calcium carbonate and calcium hydroxide (95:5) was added to the oxifulvic acid solution until a pH value of 8,0 as obtained, in order to obtain a calcium fulvate solution.

The calcium fulvate solution produced above was used to transport calcium ions to a sub soil in the manner set out below.

APPLICATION PROCEDURE

Fulvate solution, obtained by neutralising a coal-derived fulvic acid solution with calcium carbonate, as described above, was applied to the surface of soil columns 50 cm long.

In the case of control columns, pure calcium carbonate was applied to the surface.

The columns were intermittently leached with simulated rain totally 900 mm over a period of 2 months. Leachates were collected during the period and were chemically analysed. Finally, the columns were dismantled and the soil analysed for exchangeable cations and pH. It was found that, whereas in the case of the treatment with calcium carbonate only, calcium did not move through the soil and the pH did not increase in the lower part of the soil column, application of the calcium fulvate solution to the soil surface mobilised calcium most successfully. In the latter case large quantities of calcium were found in the lower part of the soil column, together with a significant increase in soil pH, as illustrated in Table 1.

TABLE 1

Ca content and pH of soil in columns surface-treated with pure $CaCO_3$ and fulvic acids-$CaCO_3$

| Soil depth (cm) | Soil pH | | Extractable Ca (mmole Ca/kg soil) | |
|---|---|---|---|---|
| | $CaCO_3$ only | $CaCO_3$ + Fulvic Acids | $CaCO_3$ only | $CaCO_3$ + Fulvic Acids |
| 0-9 | 8,2 | 8,3 | 153,4 | 140,5 |
| 9-18 | 5,6 | 7,7 | 191,0 | 423,0 |
| 18-27 | 4,7 | 6,9 | 29,0 | 319,5 |
| 27-36 | 4,7 | 5,8 | 27,0 | 221,0 |
| 36-45 | 4,8 | 5,0 | 32,5 | 137,5 |

In a further experiment, a calcium fulvate solution was produced by adding calcium hydroxide to a coal-derived fulvic acid solution described above until a pH value of 7,2 was obtained. The resulting composition contained some colloidal particles and calcium in an amount of 11,26 g dm$^{-3}$.

The downward movement of calcium in the soil was studied using cylinders 1 m long × 68 mm inside diameter. Plastic sheeting was used as lining to facilitate easy removal of the entire soil column for segmentation and analysis. Care was taken to eliminate microchannels channels in the columns. Three types of soils were used in the experiments as set out in Table 2 below.

TABLE 2

Relevant properties of experimental soils

| Soil | Clay (2 μm) % | pH (H$_2$O) | pH (1M Kcl) | CEC (soil) (cmole/kg) | Exch. bases (% of CEC) | Exch. Ca (% of CEC) |
|---|---|---|---|---|---|---|
| Avalon | 6,0 | 4,68 | 3,74 | 1,7 | 29,0 | 11,5 |
| Hutton (PP) | 20,2 | 5,02 | 4,08 | 3,2 | 39,7 | 18,8 |
| Hutton (PR) | 35,6 | 4,70 | 3,97 | 4,3 | 28,3 | 18,0 |

The columns were carefully packed with dry soil and leached with two pore volumes of deionised water as a pre-treatment to remove the salts. The following substances were then added in powder form (mixed with top 5 cm of soil) or as 150 cm$^3$ suspensions added to the surface of the water-saturated soil: $CaSO_4.2H_2O$, Ca-EDTA and Ca-fulvate (calcium fulvate as produced above). In the Ca-treatments 1,689 g Ca was added in each case; this is equivalent to 20 t/ha gypsum or 11,6 t/ha $CaCO_3$. The columns were leached with deionised water at a flow rate of 55 mm/h until two volumes of leachate had been collected in measured fractions.

The effects of $CaSO_4$, Ca-EDTA and Ca-fulvate in moving applied calcium to a depth of greater than 43 cm (chosen on the basis of segment thicknesses) were considered. The results are illustrated graphically in the attached drawing. It can be seen from this graph that, even with the limited amount of leaching, about 2 pore volumes, 27 to 46% of calcium applied as Ca-fulvate could be moved to more than 43 cm depth in soil columns. Gypsum, considered to be a practical means for supplying calcium to acidic sub soils, was very much less effective, particularly in the soils of high clay content.

It was also noted that the application of Ca-fulvate significantly increased the pH of the sub soil to which it was applied.

Further, analyses of the leachates showed that Ca-fulvate not only moved calcium very rapidly down the entire soil column, but also complexed with magnesium and potassium from the soil, resulting in a significant increase in the removal of these two elements from the soil column.

We claim:

1. A method of applying one or more alkaline earth metal elements to an acidic soil comprising the step of:
applying a composition consisting essentially of one or more alkaline earth metal elements in the form of a water-soluble salt of coal-derived fulvic acid or in the form of a complex with coal-derived fulvic acid in an aqueous medium to said soil.

2. A method according to claim 1 wherein the fulvic acid has the following elemental analysis (air-dried basis):

| Element | Range (%) |
|---|---|
| Carbon | 10-70 |
| Hydrogen | 1-6 |
| Nitrogen | 1-4 |
| Oxygen | 10-70 |

3. A method according to claim 2 wherein the fulvic acid has the following functional group analysis (air-dried basis):

| Functional Group | Range (meq/g) |
|---|---|
| Total acidity | 1-19 |
| Carboxylic groups | 2-18 |
| Phenolic groups | 0-5 |

4. A method according to claim 2 wherein the fulvic acid has the following functional group analysis (air-dried basis):

| Functional Group | Range (meq/g) |
|---|---|
| Total acidity | 8-14 |
| Carboxylic groups | 7-13 |
| Phenolic groups | 0,5-2 |

5. A method according to claim 1 wherein the fulvic acid has the following elemental analysis (air-dried basis):

| Element | Range (%) |
|---|---|
| Carbon | 20-45 |
| Hydrogen | 3-4 |
| Nitrogen | 2-3 |
| Oxygen | 40-60 |

6. A method according to claim 1 wherein the fulvic acid is present in the composition in an amount of 0,01 to 85% (m/v).

7. A method according to claim 1 wherein the pH of the composition is in the range 4 to 10.

8. A method according to claim 1 wherein the pH of the composition is in the range 7 to 9.

9. A method according to claim 1 wherein the element is selected from calcium and magnesium.

10. A method according to claim 1 wherein the soil is an acidic sub-soil and the alkaline earth metal element is transported to sub-soil from a layer above said sub-soil.

* * * * *